United States Patent
Chen (10) Patent No.: US 9,826,151 B2
(45) Date of Patent: Nov. 21, 2017

(54) IMAGE CAPTURE SYSTEM AND IMAGE CAPTURE METHOD

(71) Applicant: BOE TECHNOLOGY GROUP CO., LTD., Beijing (CN)

(72) Inventor: Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 19 days.

(21) Appl. No.: 15/109,227

(22) PCT Filed: Nov. 3, 2015

(86) PCT No.: PCT/CN2015/093618
§ 371 (c)(1),
(2) Date: Jun. 30, 2016

(87) PCT Pub. No.: WO2016/192297
PCT Pub. Date: Dec. 8, 2016

(65) Prior Publication Data
US 2017/0171465 A1 Jun. 15, 2017

(30) Foreign Application Priority Data

May 29, 2015 (CN) .......................... 2015 1 0288980

(51) Int. Cl.
| | |
|---|---|
| *H04N 5/232* | (2006.01) |
| *G06T 3/40* | (2006.01) |
| *G01B 11/14* | (2006.01) |
| *H04N 5/225* | (2006.01) |

(52) U.S. Cl.
CPC ......... *H04N 5/23232* (2013.01); *G01B 11/14* (2013.01); *G06T 3/4038* (2013.01);
(Continued)

(58) Field of Classification Search
CPC ...... H04N 5/232; H04N 5/225; H04N 5/3232; G06T 3/40; G01B 11/14
See application file for complete search history.

(56) References Cited

U.S. PATENT DOCUMENTS

| | | | |
|---|---|---|---|
| 2007/0196016 A1* | 8/2007 | Chen | .................. G06T 7/80 382/190 |
| 2009/0040301 A1* | 2/2009 | Sandler | ................ H04N 7/181 348/143 |

(Continued)

FOREIGN PATENT DOCUMENTS

| | | |
|---|---|---|
| CN | 101404757 A | 4/2009 |
| CN | 103533266 A | 1/2014 |

(Continued)

OTHER PUBLICATIONS

Written Opinion of the International Searching Authority for International Application No. PCT/CN2015/093618 and International Search Report dated Mar. 14, 2016. Translation provided by Dragon Intellectual Property Law Firm.

(Continued)

*Primary Examiner* — Dave Czekaj
*Assistant Examiner* — Berteau Joisil
(74) *Attorney, Agent, or Firm* — Harness, Dickey & Pierce, P.L.C.

(57) ABSTRACT

An image capture system includes: a pan-tilt head with a driving-and-supporting mechanism; an image capture module including at least two image capture devices fixed on the driving-and-supporting mechanism and arranged side by side in a horizontal direction or a vertical direction; a distance obtaining module configured to obtain a distance between a to-be-captured object and the image capture module; a processor configured to calculate a width P of the to-be-captured object which is capable of being currently captured by one of the image capture devices based on the distance L and a visual angle of the image capture device in (Continued)

the horizontal direction or the vertical direction, and calculate a relative rotation angle of the image capture devices in the horizontal direction or the vertical direction based on the width; and a controller configured to control the image capture device to rotate based on the relative rotation angle.

16 Claims, 5 Drawing Sheets

(52) U.S. Cl.
CPC ....... *H04N 5/2258* (2013.01); *H04N 5/23203* (2013.01); *H04N 5/23296* (2013.01)

(56) References Cited

U.S. PATENT DOCUMENTS

2010/0321473 A1* 12/2010 An ..................... H04N 5/2628
348/47
2012/0062868 A1* 3/2012 Kludas ................... G01C 15/00
356/4.01
2012/0121126 A1* 5/2012 Hwang .............. G06K 9/00228
382/103

FOREIGN PATENT DOCUMENTS

| CN | 104836960 A | 8/2015 |
| JP | H1023467 A | 1/1998 |
| JP | 2000308090 A | 11/2000 |
| KR | 20050102520 A | 10/2005 |

OTHER PUBLICATIONS

Notification of Reasons for Refusal regarding Korean Application No. 10-2016-7029163, dispatched Jul. 14, 2017. Translation provided by Dragon Intellectual Property Law Firm.

* cited by examiner

IMAGE CAPTURE SYSTEM AND IMAGE CAPTURE METHOD

CROSS REFERENCE OF RELATED APPLICATIONS

The present application is the U.S. National Phase of PCT Application No. PCT/CN2015/093618 filed on Nov. 3, 2015, which claims a priority of Chinese patent application No. 201510288980.4 filed on May 29, 2015, the disclosure of which is incorporated herein by reference in its entirety.

TECHNICAL FIELD

The present disclosure relates to the technical field of image capturing, in particular to an image capture system and an image capture method.

BACKGROUND

In the related art, a high resolution image (e.g. 1920×720 pixels) may be obtained via mosaicking two low resolution images (e.g. 1280×720 pixels) taken by two cameras. Preparation procedures before capturing the images to be mosaicked may include steps of: taking test images by two cameras; loading the images to a computer; mosaicking the images; determining whether a resolution of a mosaic image meets requirements; and if the resolution of the mosaic image does not meet the requirements, adjusting a relative angle between the two cameras, and repeating the above steps of: taking test images; loading the images to the computer; mosaicking the images; determining whether a resolution of the mosaic image meets the requirements. In some cases, the above steps may have to be repeated several times until the mosaic image meets the requirements, and thus such preparation procedures are complicated and timing consuming.

SUMMARY

In view of this, the present disclosure is to provide an image capture system and an image capture method, which can solve the problems that preparation procedures before capturing images to be mosaicked are complicated and time consuming.

In order to solve the above technical problems, the present disclosure provides in some embodiments an image capture system including:

a pan-tilt head with a driving-and-supporting mechanism;

an image capture module configured to capture images to be mosaicked to form a target mosaic image; wherein the image capture module includes at least two image capture devices fixed on the driving-and-supporting mechanism and arranged side by side in a horizontal direction or a vertical direction, and lenses of the at least two image capture devices are prime lenses of an identical focal length;

a distance obtaining module configured to obtain a distance L between a to-be-captured object and the image capture module;

a processor configured to calculate a width P1 of the to-be-captured object which is capable of being currently captured by a first one of the at least two image capture devices in the horizontal direction or the vertical direction based on the distance L and a current visual angle α of the first one of the at least two image capture devices in the horizontal direction or the vertical direction, and calculate a relative rotation angle β of the at least two image capture devices in the horizontal direction or the vertical direction based on the width P1; and a controller configured to transmit a control signal to the driving-and-supporting mechanism based on the relative rotation angle β, so as to control the image capture devices to rotate.

Optionally, the at least two image capture devices include two image capture devices, and the processor includes:

a first calculation unit configured to calculate the width P1 of the to-be-captured object which is capable of being currently captured by the first image capture device in the horizontal direction or the vertical direction according to an equation P1=2 tan(α/2)*L; and a second calculation unit configured to calculate the relative rotation angle β of the at least two image capture devices in the horizontal direction or the vertical direction according to an equation tan(α/2+β)=(P1/2+k*P1)/L, where k=(w−w1)/w1, w represents a width of the target mosaic image in the horizontal direction or the vertical direction, and w1 represents a width of an image captured by the first one of the two image capture devices in the horizontal direction or the vertical direction.

Optionally, the at least two image capture devices include two image capture devices, and the controller includes:

a first controller configured to transmit the control signal to the driving-and-supporting mechanism, so as to control a second one of the two image capture devices to rotate by the angle β in the horizontal direction or the vertical direction that is away from the first one of the two image capture devices; or a second controller configured to transmit the control signal to the driving-and-supporting mechanism, so as to control the second one of the two image capture devices to rotate by an angle β1 in the horizontal direction or the vertical direction that is away from the first one of the two image capture devices, and control the first one of the two image capture devices to rotate by an angle β2 in the horizontal direction or the vertical direction that is away from the second one of the two image capture devices; wherein the angle β equals to a sum of the angles β1 and β2.

Optionally, the image capture system further includes a resetting module configured to determine whether the distance L between the to-be-captured object and the image capture module varies, and generate and transmit a resetting signal to the processor when the distance L varies; wherein upon receiving the resetting signal, the processor recalculates the relative rotation angle β of the at least two image capture devices in the horizontal direction or the vertical direction and transmits a recalculated relative rotation angle β to the controller.

Optionally, the distance obtaining module is an electronic distance-measuring unit.

Optionally, the image capture system further includes a capture controller configured to control the at least two image capture devices to capture the images after the controller controls the image capture devices to rotate.

Optionally, the image capture system further includes an image processing device configured to obtain and mosaick the images captured by the at least two image capture devices, so as to form the target mosaic image.

The present disclosure further provides in some embodiments a method for capturing images applied to the above image capture system. The method includes steps of:

step S101: obtaining a distance L between a to-be-captured object and the image capture module;

step S102: calculating a width P1 of the to-be-captured object which is capable of being currently captured by a first one of the at least two image capture devices in the horizontal direction or the vertical direction based on the distance L and a current visual angle α of the first one of the at least two image capture devices in the horizontal direction or the vertical direction;

step S103: calculating a relative rotation angle β of the at least two image capture devices in the horizontal direction or the vertical direction based on the width P1;

step S104: transmitting a control signal to the driving-and-supporting mechanism based on the relative rotation angle β, so as to control the image capture devices to rotate; and step S105: controlling the at least two image capture devices to capture images after the image capture devices are controlled to rotate.

Optionally, the at least two image capture devices include two image capture devices, the width P1 of the to-be-captured object which is capable of being currently captured by the first one of the at least two image capture devices in the horizontal direction or the vertical direction is calculated according to an equation P1=2 tan(α/2)*L; and the relative rotation angle β of the at least two image capture devices in the horizontal direction or the vertical direction is calculated according to an equation tan(α/2+β)=(P1/2+k*P1)/L, where k=(w−w1)/w1, w represents a width of the target mosaic image in the horizontal direction or the vertical direction, and w1 represents a width of an image captured by the first one of the image capture devices in the horizontal direction or the vertical direction.

Optionally, the method further includes: determining whether the distance L between the to-be-captured object and the image capture module varies; and repeating the steps 102-106 when the distance L varies.

In the present disclosure, the technical effects of the above technical solutions are as follows.

It is able to automatically calculate the relative rotation angle β of the at least two image capture devices in the horizontal direction or the vertical direction based on the distance between the to-be-captured object and the image capture module, and control the image capture devices to rotate to accurate positions, without executing steps such as taking test images, loading the images to the computer, mosaicking the images, determining whether the resolution of the mosaic image meets the requirement. As a result, the preparation procedures before capturing the images to be mosaicked are simplified, and user experience is enhanced. In addition, images captured by the at least two image capture devices may be mosaicked in the horizontal direction or the vertical direction, so as to meet different demands.

DETAILED DESCRIPTION

The present disclosure will be specifically described hereinafter in conjunction with the drawings and embodiments. The following embodiments are for illustrative purposes, but shall not be used to limit the scope of the present disclosure.

The present disclosure provides in some embodiments an image capture system to solve the problems that preparation procedures before capturing images to be mosaicked are complicated and time consuming. The image capture system includes:

a pan-tilt head with a driving-and-supporting mechanism;

an image capture module configured to capture images to be mosaicked to form a target mosaic image, where the image capture module includes at least two image capture devices which are fixed on the driving-and-supporting mechanism and arranged side by side in a horizontal direction or a vertical direction, and lenses of the at least two image capture devices are prime lenses and have an identical focal length;

a distance obtaining module configured to obtain a distance L between a to-be-captured object and the image capture module;

a processor configured to calculate a width P1 of the object which can be captured currently by the first one of the at least two image capture devices in the horizontal direction or the vertical direction based on the distance L and current visual angles α of the at least two image capture devices in the horizontal direction or the vertical direction, and calculate a relative rotation angle β of the at least two image capture devices in the horizontal direction or the vertical direction based on the width P1; and a controller configured to transmit a control signal to the driving-and-supporting mechanism based on the relative rotation angle β, so as to control the image capture devices to rotate.

In the above image capture system, it is able to automatically calculate the relative rotation angle β of the at least two image capture devices in the horizontal direction or the vertical direction based on the distance between the to-be-captured object and the image capture module, and control the image capture device to rotate to accurate positions, without executing steps such as taking test images, loading the images to a computer, mosaicking the images and determining whether resolution of a mosaicked image meets requirements. As a result, the preparation procedures before capturing the images to be mosaicked can be simplified, and user experience is enhanced. In addition, images captured by the at least two image capture devices may be mosaicked in the horizontal direction or the vertical direction, so as to meet different demands.

In the embodiments of the present disclosure, the image capture device may be a camera, a camcorder, and etc. The number of the image capture devices may be two or more. A visual angle of the image capture device in the horizontal direction may be the same as or different from a visual angle of the image capture device in the vertical direction. In the following embodiments, as is often the case, it is assumed that the visual angle of the image capture device in the horizontal direction and the visual angle of the image capture device in the vertical direction are different.

Figure 1:
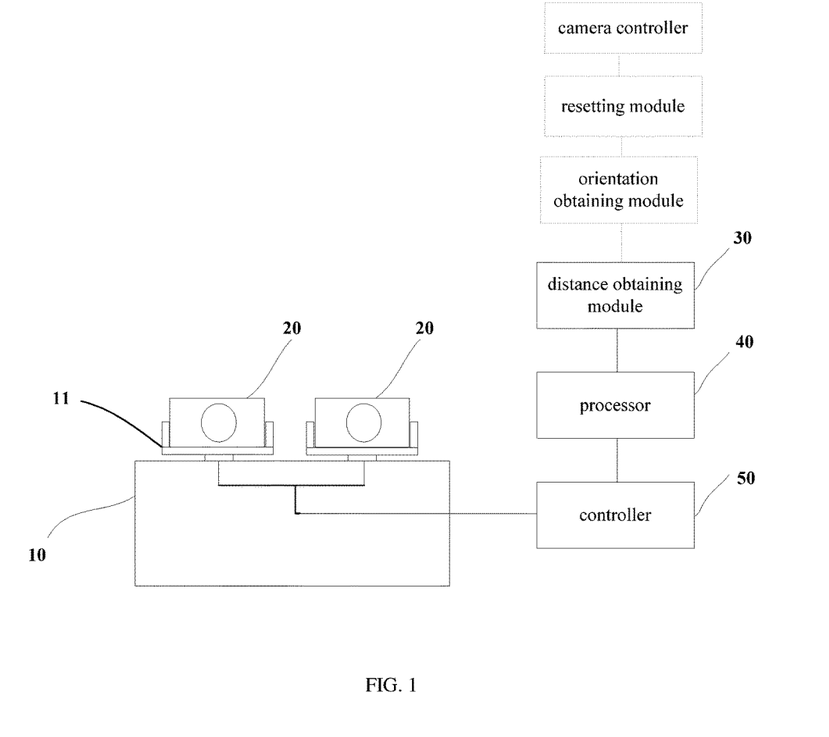
FIG. 1 is a schematic view showing an image capture system according to a first embodiment of the present disclosure.

Referring to FIG. 1, which is a schematic view showing an image capture system according to a first embodiment, the image capture system includes a pan-tilt head 10 with a driving-and-supporting mechanism 11 and two image capture devices 20. The image capture devices 20 are on the driving-and-supporting mechanism 11. The two image capture devices 20 are each arranged horizontally and the two image capture devices 20 are arranged side by side in the horizontal direction. Thus, in this embodiment, images may be mosaicked in the horizontal direction. For example, it is assumed that when the two image capture devices 20 are arranged horizontally, and each captured image has a resolution of 8K pixels in the horizontal direction and 5K pixels in the vertical direction (which indicates that the visual angle of the image capture device 20 in the horizontal direction is different from the visual angle of the image capture device 20 in the vertical direction). In such a situation, images captured by the two image capture devices 20 may be mosaicked in the horizontal direction to obtain a target mosaic image with a resolution of 12K pixels.

Figure 2:
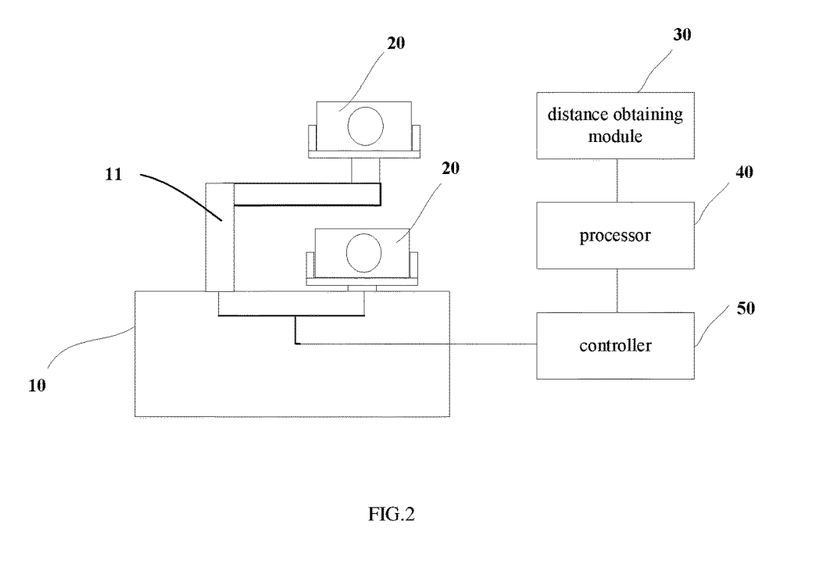
FIG. 2 is a schematic view showing an image capture system according to a second embodiment of the present disclosure.

Referring to FIG. 2, which is a schematic view showing an image capture system according to a second embodiment, the image capture system includes two image capture devices 20. The two image capture devices 20 are arranged horizontally, and are arranged side by side in the vertical direction. Thus, in this embodiment, the images may be mosaicked in the vertical direction. For example, it is assumed that when the two image capture devices 20 are arranged horizontally, and each captured image has a resolution of 8K pixels in the horizontal direction and 5K pixels in the vertical direction. In such a situation, the images captured by the two image capture devices 20 may be mosaicked in the vertical direction to obtain a target mosaic image with a resolution of 10K pixels.

Figure 3:
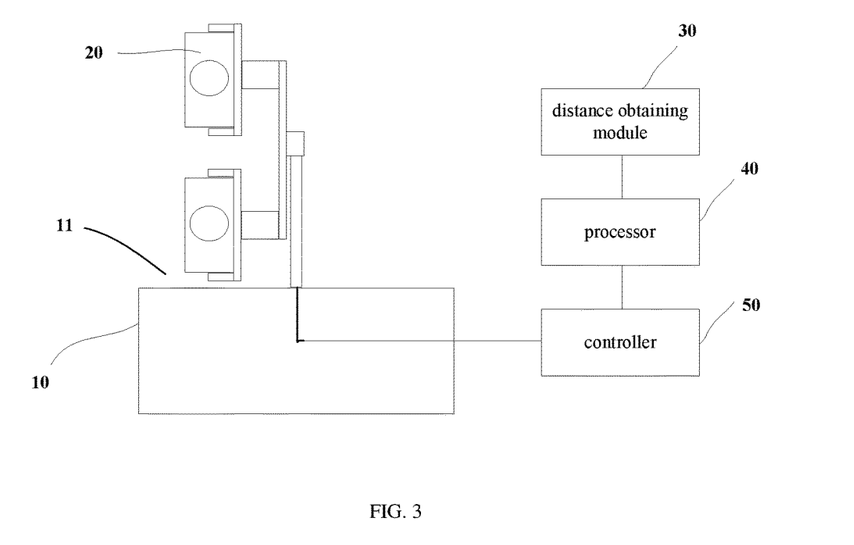
FIG. 3 is a schematic view showing an image capture system according to a third embodiment of the present disclosure.

Referring to FIG. 3, which is a schematic view showing an image capture system according to third embodiment, the image capture system includes two image capture devices 20. The two image capture devices 20 are arranged vertically and are arranged side by side in the vertical direction. Thus, in this embodiment, the images may be mosaicked in the vertical direction. For example, it is assumed that when the two image capture devices 20 are arranged vertically, and each captured image has a resolution of 8K pixels in the vertical direction and 5K pixels in the horizontal direction. In such a configuration, the images captured by the two image capture devices 20 may be mosaicked in the vertical direction to obtain a target mosaic image with a resolution of 12K pixels.

Figure 4:
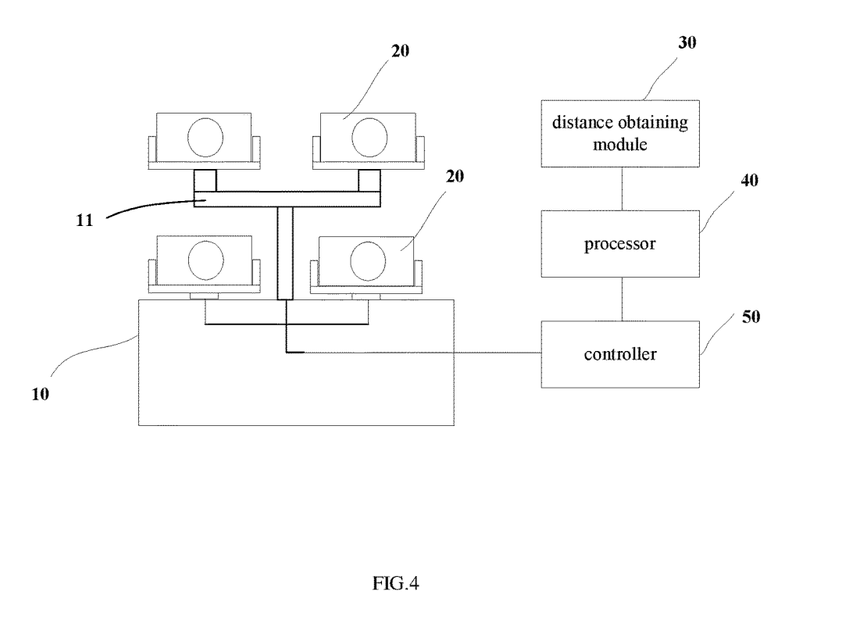
FIG. 4 is a schematic view showing an image capture system according to a fourth embodiment of the present disclosure.

Referring to FIG. 4, which is a schematic view showing an image capture system according to a fourth embodiment, the image capture system includes four image capture devices 20. The four image capture devices 20 are arranged horizontally. Every two image capture devices 20 in the horizontal direction are arranged side by side, and every two image capture devices 20 in the vertical direction are arranged side by side. Thus, in this embodiment, the images may be mosaicked in both the horizontal direction and the vertical direction.

Optionally, in the embodiments of the present disclosure, the driving-and-supporting mechanism may adjust at least two image capture devices to be side by side in the horizontal direction or the vertical direction according to needs. For example, when it is desired to obtain a mosaic image in the horizontal direction, the two image capture devices may be adjusted to be side by side in the horizontal direction as shown in FIG. 1; and when it is desired to obtain a mosaic image in the vertical direction, the two image capture devices may be adjusted from being side by side in the horizontal direction to be side by side in the vertical direction as shown in FIG. 2 or 3.

In the condition that the visual angle of the image capture device in the horizontal direction is different from the visual angle of the image capture device in the vertical direction, when arrangement modes of the image capture device are varied (arranged vertically or horizontally), a current visual angle thereof in the horizontal direction or the vertical direction is changed accordingly. For example, when the image capture device is arranged horizontally, a current visual angle thereof in the horizontal direction is $\alpha 1$, and a current visual angle thereof in the vertical direction is $\alpha 2$; and then when the image capture device is arranged vertically, a current visual angle thereof in the horizontal direction is $\alpha 2$, and a current visual angle thereof in the vertical direction is $\alpha 1$.

The current visual angle $\alpha$ of the image capture device in the horizontal direction or the vertical direction may be inputted by a user. For example, the image capture system may provide a user input interface for the user to inputting the visual angle $\alpha$. Alternatively, the user may directly input a focal length M and an arrangement mode of the image capture device. At this point, it is necessary to store a relational table of focal lengths and visual angles in the image capture system, so that it enables to look up the relational table based on the focal length M and the arrangement mode of the image capture device which are input by the user, and then to determine the current visual angle $\alpha$ of the image capture device in the horizontal direction or the vertical direction.

For example, the relational table may be as follows, which is a relational table of focal lengths and horizontal visual angles when the image capture device is arranged horizontally.

| Focal Length (mm) | Visual angle (degrees) |
|---|---|
| 12.00 | 121.9657188 |
| 14.00 | 114.1821314 |
| 15.00 | 110.5270374 |
| 18.00 | 100.4756817 |
| 20.00 | 94.49321352 |
| 21.00 | 91.70210518 |
| 25.00 | 81.74138908 |
| 28.00 | 75.38064962 |
| 30.00 | 71.59151983 |
| 31.00 | 69.81841782 |
| 35.00 | 63.4399666 |
| 40.00 | 56.81194376 |
| 43.00 | 53.41395316 |
| 45.00 | 51.35092643 |
| 50.00 | 46.79300334 |
| 55.00 | 42.94269031 |
| 58.00 | 40.90982996 |
| 60.00 | 39.65405731 |
| 70.00 | 34.34724073 |
| 77.00 | 31.38563313 |
| 80.00 | 30.26361357 |

The arrangement mode of the image capture device may be inputted by the user, or may be obtained based on an orientation of the driving-and-supporting mechanism. Optionally, in the embodiments of the present disclosure, the image capture system may further include an orientation obtaining module for obtaining a supporting orientation of the driving-and-supporting mechanism, so as to determine whether the image capture device is arranged horizontally or vertically.

In the embodiments of the present disclosure, the distance obtaining module is configured to obtain a distance L between the to-be-captured object and the image capture module. The distance between the to-be-captured object and the image capture module generally refers to a distance between the to-be-captured object and a lens of the image capture device included in the image capture module.

Figure 5:
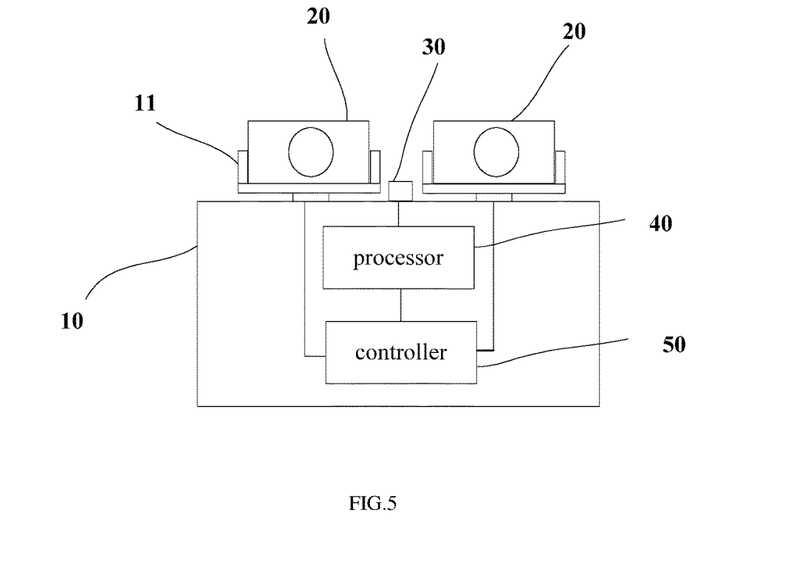
FIG. 5 is a schematic view showing an image capture system according to a fifth embodiment of the present disclosure.

Optionally, the distance obtaining module may be an electronic distance-measuring unit which is capable of automatically measuring the distance L between the to-be-captured object and the image capture module and transmitting the distance L to a processor. The electronic distance-measuring unit may be arranged on the pan-tile head 10, and arranged side by side with the at least two image capture devices in the horizontal direction or the vertical direction. As shown in FIG. 5, the image capture module includes two image capture devices 20, and an electronic distance-measuring unit 30 between the two image capture devices 20. At this point, the distance between the to-be-captured object and the image capture module is a distance between the to-be-captured object and the electronic distance-measuring unit 30. The electronic distance-measuring unit may be a laser distance-measuring unit, a global positioning system (GPS) distance-measuring unit, and etc. The laser distance-measuring is typically used in a condition that an object of a short distance is to be captured, and the GPS distance-measuring unit is typically used in a condition that an object of a long distance is to be captured.

Of course, in another embodiment of the present disclosure, the distance L between the to-be-captured object and the image capture module may be measured manually. Meanwhile, the image capture system may provide a user input interface for the user to input the measured distance L. The manual measurement may be implemented by a measuring tool such as a tape measure, an electronic distance-measuring unit, and etc.

As shown in FIGS. 1-4, in the embodiments of the present disclosure, the processor and the controller may be arranged separately from the pan-tilt head; or of course, the processor and the controller may be arranged within the pan-tilt head as shown in FIG. 5.

The processor may calculate a width P1 of the to-be-captured object which is capable of being currently captured by the first one of the at least two image capture devices in the horizontal direction or the vertical direction based on the distance L between the to-be-captured object and the image capture module and a current visual angle $\alpha$ of the image capture device in the horizontal direction or the vertical direction, and calculate a relative rotation angle $\beta$ of the at least two image capture devices in the horizontal direction or the vertical direction based on the width P1.

The distance L between the to-be-captured object and the image capture module may be obtained and transmitted to the processor by the distance obtaining module. Since the at least two image capture devices of the image capture module are arranged side by side, thus the distance L between the to-be-captured object and the image capture module is a distance between each of the image capture devices and the to-be-captured object.

In the following, it is explained a method for calculating a relative rotation angle $\beta$ of two image capture devices in the horizontal direction by assuming that, for example, the image capture module includes two image capture devices (i.e., a first image capture device and a second image capture device), and the two image capture devices are arranged horizontally and arranged side by side.

Figure 6:
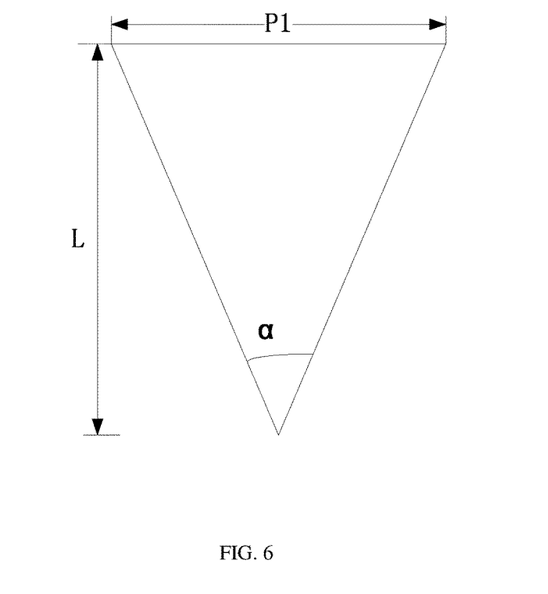
FIGS. 6 and 7 are schematic views showing a method for calculating a relative rotation angle of two image capture devices in a horizontal direction according to one embodiment of the present disclosure.

Referring to FIG. 6, the following equation may be obtained after the distance L between the to-be-captured object and the image capture module and the current visual angle $\alpha$ of the image capture device in the horizontal direction are obtained: $(P1/2)/L=\tan(\alpha/2)$, and thus P1 may be calculated by an equation: $P1=2\tan(\alpha/2)*L$.

In other words, it is obtained the width P1 of the to-be-captured object that is capable of being currently captured by the first image capture device in the horizontal direction.

Figure 7:
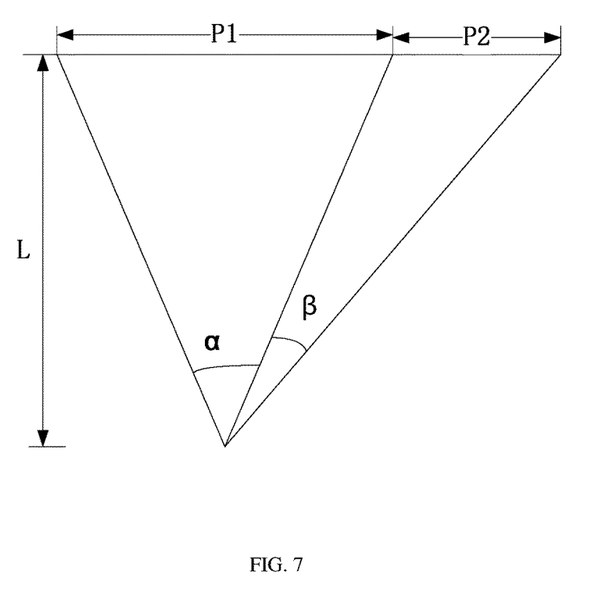

Referring to FIG. 7, when the first image capture device and the second image capture device may be deemed as a point, the following equation may be obtained: $\tan(\alpha/2+\beta)=(P1/2+P2)/L$, where P2 represents the width of the to-be-captured object that is capable of being captured by the second image capture device in the horizontal direction, $P2=k*P1$, and k may be calculated by an equation: $k=(w-w1)/w1$, where w represents a width of the target mosaic image in the horizontal direction, and w1 represents a width of an image captured by the first image capture device in the horizontal direction.

For example, the target mosaic image has a width (resolution) of 10K pixels in the horizontal direction, and the image captured by the first image capture device has a width of 8K pixels in the horizontal direction, then $k=(10-8)/8=0.25$.

Thus, the relative rotation angle $\beta$ may be calculated by an equation $\tan(\alpha/2+\beta)=(P1/2+k*P1)/L$.

Figure 8:
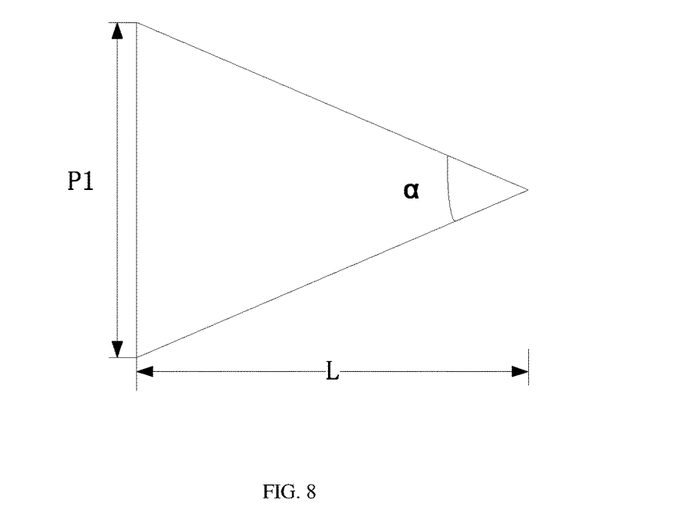
FIGS. 8 and 9 are schematic views showing a method for calculating a relative rotation angle of the two image capture devices in a vertical direction according to one embodiment of the present disclosure.
Figure 9:
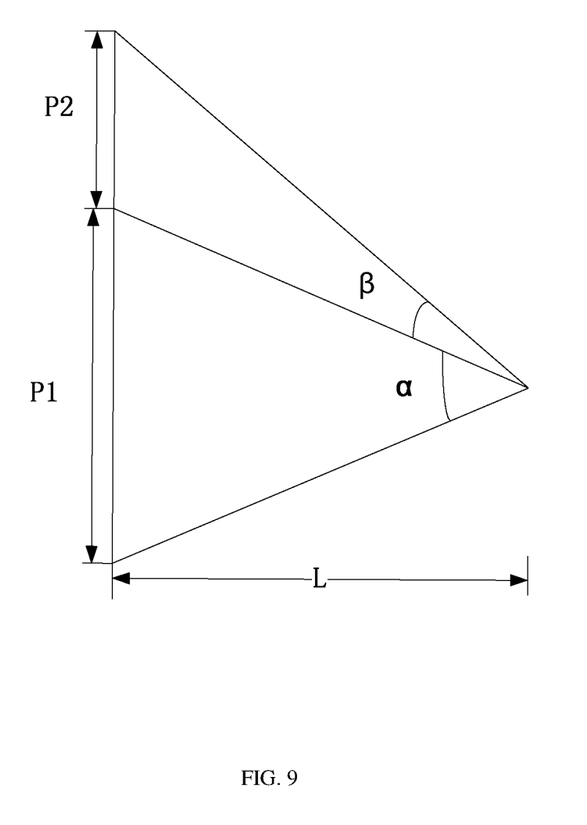

As shown in FIGS. 8-9, when the two image capture devices are arranged side by side in the vertical direction, the method for calculating the relative rotation angle $\beta$ is similar to the above method for calculating the relative rotation angle $\beta$ when the two image capture devices are arranged side by side in the horizontal direction.

To sum up, when the number of the image capture devices are two, the controller may include:

a first calculation unit configured to calculate the width P1 of the to-be-captured object that is capable of being currently captured by the first image capture device in the horizontal direction or the vertical direction according to an equation $P1=2\tan(\alpha/2)*L$; and a second calculation unit configured to calculate the relative rotation angle $\beta$ of the at least two image capture devices in the horizontal direction or the vertical direction according to an equation $\tan(\alpha/2+\beta)=(P1/2+k*P1)/L$, where $k=(w-w1)/w1$, w represents a width of the target mosaic image in the horizontal direction or the vertical direction, and w1 represents a width of an image captured by the first image capture device in the horizontal direction or the vertical direction.

In the embodiments of the present disclosure, the controller is configured to transmit a control signal to the driving-and-supporting mechanism based on the relative rotation angle $\beta$, so as to control the image capture device to rotate.

When the number of the image capture devices are two, the controller may include:

a first controller configured to transmit the control signal to the driving-and-supporting mechanism, so as to control the second image capture device to rotate by the angle $\beta$ in the horizontal direction or the vertical direction that is away from the first image capture device; or a second controller configured to transmit the control signal to the driving-and-supporting mechanism, so as to control the second image capture device to rotate by the angle β1 in the horizontal direction or the vertical direction that is away from the first image capture device, and control the first image capture device to rotate by the angle β2 in the horizontal direction or the vertical direction that is away from the second image capture device, where the angle β equals to a sum of the angles β1 and β2.

In other words, the controller may control the image capture devices to rotate in either of two modes, i.e. a first mode of rotating one image capture device while holding a position of the other image capture device, and a second mode of rotating both image capture devices at a same time.

In the embodiments of the present disclosure, when the distance L between the to-be-captured object and the image capture module varies, it is necessary to recalculate the relative rotation angle β of the at least two image capture devices in the horizontal direction or the vertical direction, and readjust positions of the image capture devices, so as to meet the requirement.

Optionally, the image capture system further includes a resetting module configured to determine whether the distance L between the to-be-captured object and the image capture module varies, and generate and transmit a resetting signal to the processor when the distance L varies.

Upon receiving the resetting signal, the processor recalculates the relative rotation angle β of the at least two image capture devices in the horizontal direction or the vertical direction and transmits the recalculated relative rotation angle β to the controller.

In the embodiments of the present disclosure, in order to automatically control the image capture device to capture images, the image capture system may further include: a capture controller configured to control the at least two image capture devices to capture images after the controller controls the image capture devices to rotate.

In the embodiments of the present disclosure, in order to mosaick the images captured by the image capture devices, the image capture system may further include: an image processing device configured to obtain and mosaick the images captured by the at least two image capture devices, so as to form the target mosaic image.

The image processing device may be a computer.

The present disclosure further provides in some embodiments a method for capturing images, which may be applied to the image capture system in any one of the above embodiments. The method includes the following steps.

Step S101 is to obtain a distance L between a to-be-captured object and the image capture module.

Step S102 is to calculate a width P1 of the to-be-captured object which is capable of being currently captured by the first one of the at least two image capture devices in the horizontal direction or the vertical direction based on the distance L and a current visual angle α of the two image capture device in the horizontal direction or the vertical direction.

Step S103 is to calculate a relative rotation angle β of the at least two image capture devices in the horizontal direction or the vertical direction based on the width P1.

Step S104 is to transmit a control signal to the driving-and-supporting mechanism based on the relative rotation angle β, so as to control the image capture devices to rotate.

Step S105 is to control the at least two image capture devices to capture images after the image capture devices are controlled to rotate.

Optionally, the number of the at least two image capture devices are two, and the width P1 of the to-be-captured object which is capable of being currently captured by the first image capture device in the horizontal direction or the vertical direction is calculated according to an equation $P1=2\tan(\alpha/2)*L$; and the relative rotation angle β of the two image capture devices in the horizontal direction or the vertical direction is calculated according to an equation $\tan(\alpha/2+\beta)=(P1/2+k*P1)/L$, where $k=(w-w1)/w1$, w represents a width of the target mosaic image in the horizontal direction or the vertical direction, and w1 represents a width of an image captured by the first image capture device in the horizontal direction or the vertical direction.

Optionally, the method further includes: determining whether the distance L between the to-be-captured object and the image capture module varies, and repeating the steps 102-106 when the distance L varies.

The above are merely the preferred embodiments of the present disclosure. It should be noted that, a person skilled in the art may make improvements and modifications without departing from the principle of the present disclosure, and these improvements and modifications shall also fall within the scope of the present disclosure.

What is claimed is:

1. An image capture system, comprising:
a pan-tilt head with a driving-and-supporting mechanism;
an image capture module configured to capture images to be mosaicked to form a target mosaic image; wherein the image capture module comprises at least two image capture devices fixed on the driving-and-supporting mechanism and arranged side by side in a horizontal direction or a vertical direction, and lenses of the at least two image capture devices are prime lenses of an identical focal length;
a distance obtaining module configured to obtain a distance L between a to-be-captured object and the image capture module;
a processor configured to calculate a width P1 of the to-be-captured object which is capable of being currently captured by a first one of the at least two image capture devices in the horizontal direction or the vertical direction based on the distance L and a current visual angle α of the first one of the at least two image capture devices in the horizontal direction or the vertical direction, and calculate a relative rotation angle β of the at least two image capture devices in the horizontal direction or the vertical direction based on the width P1; and
a controller configured to transmit a control signal to the driving-and-supporting mechanism based on the relative rotation angle β, so as to control the image capture devices to rotate.

2. The image capture system according to claim 1, wherein the at least two image capture devices comprise two image capture devices, and the processor comprises:
a first calculation unit configured to calculate the width P1 of the to-be-captured object which is capable of being currently captured by the first image capture device in the horizontal direction or the vertical direction according to an equation $P1=2\tan(\alpha/2)*L$; and
a second calculation unit configured to calculate the relative rotation angle β of the at least two image capture devices in the horizontal direction or the vertical direction according to an equation $\tan(\alpha/2+\beta)=$ (P1/2+k*P1)/L, where k=(w−w1)/w1, w represents a width of the target mosaic image in the horizontal direction or the vertical direction, and w1 represents a width of an image captured by the first one of the two image capture devices in the horizontal direction or the vertical direction.

3. The image capture system according to claim 1, wherein the at least two image capture devices comprise two image capture devices, and the controller comprises:
   a first controller configured to transmit the control signal to the driving-and-supporting mechanism, so as to control a second one of the two image capture devices to rotate by the angle β in the horizontal direction or the vertical direction that is away from the first one of the two image capture devices; or
   a second controller configured to transmit the control signal to the driving-and-supporting mechanism, so as to control the second one of the two image capture devices to rotate by an angle β1 in the horizontal direction or the vertical direction that is away from the first one of the two image capture devices, and control the first one of the two image capture devices to rotate by an angle β2 in the horizontal direction or the vertical direction that is away from the second one of the two image capture devices;
   wherein the angle β equals to a sum of the angles β1 and β2.

4. The image capture system according to claim 1, further comprising:
   a resetting module configured to determine whether the distance L between the to-be-captured object and the image capture module varies, and generate and transmit a resetting signal to the processor when the distance L varies;
   wherein upon receiving the resetting signal, the processor recalculates the relative rotation angle β of the at least two image capture devices in the horizontal direction or the vertical direction and transmits a recalculated relative rotation angle β to the controller.

5. The image capture system according to claim 1, wherein the distance obtaining module is an electronic distance-measuring unit.

6. The image capture system according to claim 1, further comprising:
   a capture controller configured to control the at least two image capture devices to capture the images after the controller controls the image capture devices to rotate.

7. The image capture system according to claim 1, further comprising:
   an image processing device configured to obtain and mosaick the images captured by the at least two image capture devices, so as to form the target mosaic image.

8. A method for capturing images applied to the image capture system according to claim 1, wherein the method comprises steps of:
   step S101: obtaining a distance L between a to-be-captured object and the image capture module;
   step S102: calculating a width P1 of the to-be-captured object which is capable of being currently captured by a first one of the at least two image capture devices in the horizontal direction or the vertical direction based on the distance L and a current visual angle α of the first one of the at least two image capture devices in the horizontal direction or the vertical direction;
   step S103: calculating a relative rotation angle β of the at least two image capture devices in the horizontal direction or the vertical direction based on the width P1;
   step S104: transmitting a control signal to the driving-and-supporting mechanism based on the relative rotation angle β, so as to control the image capture devices to rotate; and
   step S105: controlling the at least two image capture devices to capture images after the image capture devices are controlled to rotate.

9. The method according to claim 8, wherein the at least two image capture devices comprise two image capture devices,
   the width P1 of the to-be-captured object which is capable of being currently captured by the first one of the at least two image capture devices in the horizontal direction or the vertical direction is calculated according to an equation $P1=2\tan(\alpha/2)*L$; and
   the relative rotation angle β of the at least two image capture devices in the horizontal direction or the vertical direction is calculated according to an equation $\tan(\alpha/2+\beta)=(P1/2+k*P1)/L$, where $k=(w-w1)/w1$, w represents a width of the target mosaic image in the horizontal direction or the vertical direction, and w1 represents a width of an image captured by the first one of the image capture devices in the horizontal direction or the vertical direction.

10. The method according to claim 8, further comprising steps of:
    determining whether the distance L between the to-be-captured object and the image capture module varies; and
    repeating the steps 102-106 when the distance L varies.

11. The method according to claim 8, wherein the at least two image capture devices comprise two image capture devices, and the processor comprises:
    a first calculation unit configured to calculate the width P1 of the to-be-captured object which is capable of being currently captured by the first image capture device in the horizontal direction or the vertical direction according to an equation $P1=2\tan(\alpha/2)*L$; and
    a second calculation unit configured to calculate the relative rotation angle β of the at least two image capture devices in the horizontal direction or the vertical direction according to an equation $\tan(a/2+\beta)=(P1/2+k*P1)/L$, where $k=(w-w1)/w1$, w represents a width of the target mosaic image in the horizontal direction or the vertical direction, and w1 represents a width of an image captured by the first one of the two image capture devices in the horizontal direction or the vertical direction.

12. The method according to claim 8, wherein the at least two image capture devices comprise two image capture devices, and the controller comprises:
    a first controller configured to transmit the control signal to the driving-and-supporting mechanism, so as to control a second one of the two image capture devices to rotate by the angle β in the horizontal direction or the vertical direction that is away from the first one of the two image capture devices; or
    a second controller configured to transmit the control signal to the driving-and-supporting mechanism, so as to control the second one of the two image capture devices to rotate by an angle β1 in the horizontal direction or the vertical direction that is away from the first one of the two image capture devices, and control the first one of the two image capture devices to rotate by an angle β2 in the horizontal direction or the vertical direction that is away from the second one of the two image capture devices;

wherein the angle β equals to a sum of the angles β1 and β2.

13. The method according to claim 8, wherein the image capture system further comprises:
   a resetting module configured to determine whether the distance L between the to-be-captured object and the image capture module varies, and generate and transmit a resetting signal to the processor when the distance L varies;
   wherein upon receiving the resetting signal, the processor recalculates the relative rotation angle β of the at least two image capture devices in the horizontal direction or the vertical direction and transmits a recalculated relative rotation angle β to the controller.

14. The method according to claim 8, wherein the distance obtaining module is an electronic distance-measuring unit.

15. The method according to claim 8, wherein the image capture system further comprises:
   a capture controller configured to control the at least two image capture devices to capture the images after the controller controls the image capture devices to rotate.

16. The method according to claim 8, wherein the image capture system further comprises:
   an image processing device configured to obtain and mosaick the images captured by the at least two image capture devices, so as to form the target mosaic image.

* * * * *